June 4, 1940.

A. P. ARMINGTON 2,202,940

YIELDABLE MOUNT MEANS

Filed Feb. 20, 1937

ARTHUR P. ARMINGTON
*INVENTOR*

BY Burkett, Hyde, Higley & Meyer
*ATTORNEY*

Patented June 4, 1940

2,202,940

UNITED STATES PATENT OFFICE 2,202,940

YIELDABLE MOUNT MEANS

Arthur P. Armington, Willoughby, Ohio; Katherine Stewart Armington, executrix of Arthur P. Armington, deceased, assignor to The Euclid Road Machinery Company, Euclid, Ohio, a corporation of Ohio Application February 20, 1937, Serial No. 126,759

2 Claims. (Cl. 248—358)

This invention relates to means for interconnecting a pair of large objects or members for support of one on the other, permitting limited yieldably opposed motion therebetween, and the invention comprises generally improvements upon the device illustrated and described in my Patent No. 2,128,216 issued August 30, 1938.

More particularly, the invention pertains to that type of mounting means employing a resilient element of rubber or the like, mounted to be effective between the members which it interconnects, to be deformed, with flexure of its parts, in transmitting loading from one member to the other. Such an element so loaded in any direction, will yieldably resist deformation under load, with definite characteristics of increase in resistance relative to increase in load, and generally with resistance increasing with load increase, and the object of this invention is to provide means for obtaining the desired characteristics for an intended duty.

Still more particularly the invention contemplates a mounting adapted to vehicular use as for support of a vehicle body upon its running gear wherein, and as a particular object of the invention, the desired characteristic, so far as vertical load is concerned, is that the mounting provide relatively free sprung motion through relatively great range of its flexure, with rapidly increasing resistance as the limit of flexure is closely approached. Another form of the invention has as its object to serve with sudden helper spring effect, as in a vehicle which is to operate either empty or fully loaded only, that is, seldom with a partial load.

Figure 1:
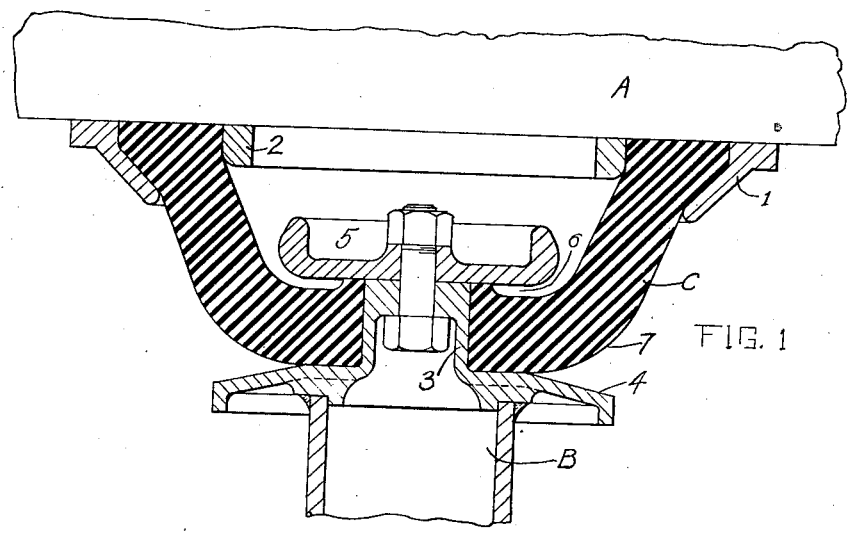
Figure 2:
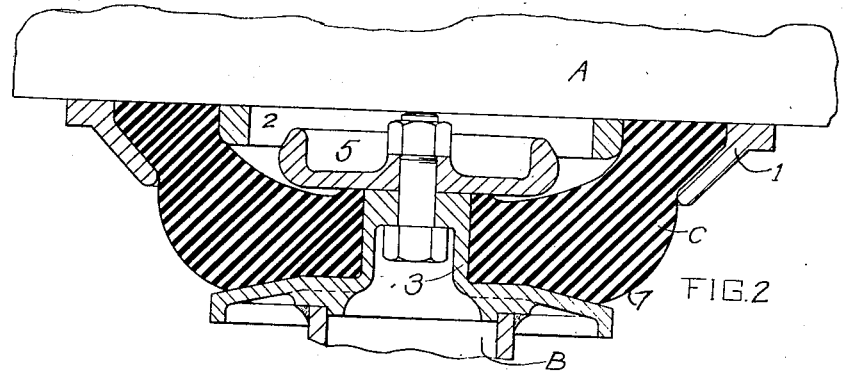
Figure 3:
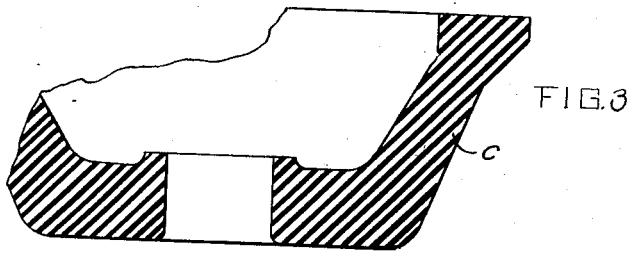

The exact nature of this invention together with further objects and advantages thereof will be apparent from the following description taken in connection with the accompanying drawing, in which Fig. 1 is a typical longitudinal section through a mounting unit embodying the invention, showing the parts as unloaded; Fig. 2 is a similar view of the same but with the parts under heavy load; and Fig. 3 shows in similar section, a modified form of resilient element.

With reference now to the drawing and first to Figs. 1 and 2 thereof, A represents a member of an object to be supported, such as a frame member of a vehicle body. B represents generally a member of a supporting object such as connected to the vehicle axle by means not shown and forming no part of this invention, but fully illustrated and described in my copending application, Serial No. 127,975, filed February 26, 1937. C represents an element of resilient material such as rubber or the like, through which the member A is to have support from the member B.

The element C will be observed as generally of arched section inverted as here illustrated, having opposed side parts extending divergently from a small end part adjacent the member B and toward the member A. Conveniently but not necessarily the element is symmetrical about a central longitudinal axis, vertically disposed in the drawing, so that the element is generally of bell shape, inverted, with a transversely continuous flexible wall disposed to extend divergently from a small end part adjacent the member B to a mouth end part adjacent the member A.

Means are provided for securing the large end of the element to its member A, against which, in the embodiment here shown, the element has direct bearing. Such means comprises a clamp part 1 peripherally disposed about the mouth of the element with a lip part overlying the sloping peripheral extremity of the element, and removably secured to the member A as by bolts not shown; whereby the mouth end of the element is firmly clamped to the member A. A ring part 2 fitting within the mouth of the element may preferably be provided to back the latter against part 1 and thereby make more positive the securement of the element.

The opposite end part of the element is centrally secured to the other member B. For the purpose as here shown the element is provided with a central opening fitting over a projection 3 on the member B, the member B having a face 4 about the projection 3 and against which the end of the element bears. A retainer member 5 within the hollow of the element C is bolted as shown, or otherwise removably secured to the member B at the end of the projection 3 for positively retaining the small end of the element upon the projection. One of the parts, as the element, is preferably undercut as at 6 adjacent the retainer 5 to provide space into which the element material may flow under load. The parts 1, 2 and 5 have their extremities adjacent the element curved as indicated to avoid cutting into the material of the element under load.

The wall of material which forms the element C is so curved as indicated in the drawing that there is no sharp delineation between its end part, the outer face of which bears against the face 4 of the member B, and the divergent wall parts integral with the end part and having their remote extremities confined by the part 1. The parts are, however, so proportioned and arranged that a substantial portion of the divergent wall parts of the element intermediate its ends will be transversely unconfined in any direction.

Where a wide range of continuously variable load is to be met, it is particularly desirable that the outer surface of the element between its end and side wall parts as at 7 have curvature of such large radius as is indicated in the drawing, so that the bearing area of the element against the face 4 of the member B, when the parts are unloaded or but lightly loaded, be confined to a relatively small annulus immediately about the projection 3, as indicated in Fig. 1. Also as there indicated, the face 4 of the member B may be flat throughout this area.

The face 4, however, extends from the projection 3 transversely substantially beyond such area, and there recedes somewhat from the element C as shown in the drawing, so that the face 4 considered in its entirety, is generally convex.

Operation will be as follows. Commencing with the parts unloaded as in Fig. 1 and considering only a load which is generally compressive upon the element C, as the load increases the element will be deformed in approach to its condition as shown in Fig. 2. Particularly, the bearing area between the end of the element and the face 4 of its supporting member, will increase outwardly from the projection 3, beyond the flatter inner part of the face and onto the outer receding part of the face. As the bearing upon the face 4 is thus increased, the effective divergence of the side wall parts of the element is decreased, these wall parts of the element approaching a cylindrical shape rather than the original generally conical one.

But owing to the convexity of the face 4, both such increased bearing area of the element C thereagainst, and also such tendency toward cylindrical disposition of the formerly conical side wall parts of the element, are less than they would be were the face 4 entirely flat. Consequently the characteristic of the element is to provide greater resilience, or rather less resistance to deflection through a longer range of deflection, than would otherwise be the case.

As to loading in directions other than the compressive direction just described, the parts will function substantially as in my earlier filed applications above identified and generally the element C will permit yet resist relative movement of the parts between which it acts, in any direction.

Obviously the device may be positioned with any disposition of its axis without affecting its functioning under forces similarly directed with respect to such axis.

It is noted that to increase the flexibility and motion of the sprung effect of the load—to lighten the springiness—the face of the member against which the small end of the element bears, has been made convex as taught by this invention. Similarly the invention teaches that should it be desired to decrease the flexibility and motion of the sprung effect of the load—to stiffen the springiness—it is within the teachings of this invention to make such face concave instead of convex, with a concavity of such greater radius, however, relative to that of the element C, that the initial unloaded bearing area between element and face, will be substantially less than the bearing area under load.

With reference now to Fig. 3, an element is shown of form modified in two respects.

The corner at the joinder between end and side wall parts is of shorter radius than in the element C, so that the flat part of its end face is of greater diameter.

In this respect this form is preferable in some vehicle body supporting applications where the vehicle is to travel usually either empty or with a full load. The element when mounted as in Figs. 1 and 2, will have a light load range wherein the peripheral part of its end has no bearing, and a heavy load range wherein it bears substantially throughout its area. In other words, the bearing area will suddenly increase from minimum to substantial maximum, instead of gradually as in Figs. 1 and 2, with the effect of a helper spring.

The form of Fig. 3 is modified also in that its side walls are of thickness gradually decreasing from its small end part to its large end part, the purpose being to provide more uniformity of flexure or flow in the material of the element during service. The thickness graduation is preferably such as to maintain a uniform area in transverse section throughout the unconfined side wall portions.

Obviously the element in Figs. 1 and 2 could have its side walls thus graduated although they are not so shown.

What I claim is:

1. Means providing yieldable support between a pair of members and comprising a resilient element of rubber or the like generally of arched section, having opposed side parts extending divergently from a small end part adjacent one member to the other member, means securing the extremities of said side parts to their adjacent members, the small end part of said element and its adjacent member having cooperative bearing faces, the bearing face of said adjacent member extending laterally about and beyond the area of bearing of the element thereagainst when lightly loaded, and the extending face portion having gradual departure from the general plane of said area.

2. Means providing yieldable support between a pair of members and comprising a resilient element of rubber or the like generally of cup shape and substantially of uniform section about a central axis, said cup shape element having side walls and an end wall, means securing the free extremities of said side walls to one of said members, means securing said end wall adjacent said axis to the other of said members, the end wall of said element and its adjacent member having cooperative bearing faces diverging radially outwardly from said axis, and said side walls being peripherally free of confinement at other points than their secured extremities.

ARTHUR P. ARMINGTON.